United States Patent
Takahashi et al.

(10) Patent No.: US 7,591,142 B2
(45) Date of Patent: Sep. 22, 2009

(54) AIR CONDITIONER FOR VEHICLE

(75) Inventors: Eiji Takahashi, Ashikaga (JP); Yoshihiro Ayabe, Sano (JP); Ryoichi Yokoi, Isesaki (JP); Kazuhito Mouri, Wako (JP)

(73) Assignees: Calsonic Kansei Corporation, Tokyo (JP); Honda Motor Co., Ltd, Tokyo (JP)

( * ) Notice: Subject to any disclaimer, the term of this patent is extended or adjusted under 35 U.S.C. 154(b) by 405 days.

(21) Appl. No.: 11/440,006

(22) Filed: May 25, 2006

(65) Prior Publication Data
US 2006/0266062 A1 Nov. 30, 2006

(30) Foreign Application Priority Data
May 25, 2005 (JP) .............................. 2005-153187

(51) Int. Cl.
*F25B 1/00* (2006.01)
*B60H 1/32* (2006.01)
*B60H 3/00* (2006.01)

(52) U.S. Cl. .......................... 62/228.1; 62/239; 62/244; 165/42

(58) Field of Classification Search ................ 62/228.1, 62/230, 239, 244; 165/42
See application file for complete search history.

(56) References Cited

U.S. PATENT DOCUMENTS
2004/0057840 A1* 3/2004 Hirota ..................... 417/222.2

FOREIGN PATENT DOCUMENTS
JP 2001-121952 A 5/2001

* cited by examiner

*Primary Examiner*—Chen-Wen Jiang
(74) *Attorney, Agent, or Firm*—Antonelli, Terry, Stout & Kraus, LLP.

(57) ABSTRACT

An air conditioner for a vehicle includes a refrigeration cycle having a variable capacity compressor, a condenser, an expansion valve, and an evaporator; a duct in which the evaporator is arranged; an air switching unit arranged on an upstream side of the duct and configured to switch outside air and inside air from one to the other; an air outlet arranged on a downstream side of the duct and communicating with an interior of the vehicle; and a control unit configured to control a discharge of the compressor. The control unit controls the compressor to provide a maximum capacity if the difference between a vehicle interior temperature and an ambient temperature is higher than a predetermined value and if the air switching unit is switched from a recirculation mode to a fresh air mode.

4 Claims, 10 Drawing Sheets

PISTON STROKE

AIR CONDITIONER FOR VEHICLE

CROSS REFERENCE TO RELATED APPLICATIONS AND INCORPORATION BY REFERENCE

This application is based upon and claims the benefit of priority from the prior Japanese Patent Application No. 2005-153187 filed on May 25, 2005; the entire contents of which are incorporated herein by reference.

BACKGROUND OF THE INVENTION

1. Field of the Invention

The present invention relates to an air conditioner for a vehicle. The air conditioner includes a refrigeration cycle having a variable capacity compressor.

2. Description of the Related Art

An example of an air conditioner for a vehicle is disclosed in Japanese Unexamined Patent Application Publication No. 2001-121952 (paragraphs 0023 to 0025 and FIG. 1). This air conditioner includes a refrigeration cycle having a variable capacity compressor. A change in the discharge of the compressor results in changing a flow rate of coolant circulating through the refrigeration cycle, thereby changing a flow rate of coolant flowing through an evaporator and the temperature of air blown from the evaporator into a vehicle interior.

SUMMARY OF THE INVENTION

The above-mentioned related art controls the discharge of the variable capacity compressor in such a way as to minimize the difference between an air temperature detected at an exit of the evaporator and a target air temperature set for the exit of the evaporator. During the control operation, air blown from the evaporator must avoid overshooting the target temperature and the compressor must prevent occurrence of loud mechanical noise such as a hunting noise. To achieve this, the related art gradually decreases or increases the discharge of the compressor. FIG. 12 is a graph showing an example of such gradual control of the compressor. In FIG. 12, the duty factor of a control signal is used to control the discharge of the compressor. When the control signal has a duty factor of 100%, the compressor provides a maximum capacity, and when the control signal has a duty factor of 0%, the compressor provides a minimum discharge. To prevent a sharp change in the discharge of the compressor, the related art slowly changes the duty factor of the control signal. In FIG. 12, a curve R represents the duty factor of the control signal, a curve T1 the temperature of air at an entrance of the evaporator, and a curve T2 the temperature of air at an exit of the evaporator. According to the related art, the duty factor of the control signal slowly responds to a change in the temperature of air at the entrance of the evaporator. In FIG. 12, a recirculation (REC) mode is switched at t1 to a fresh air (FRE) mode. Due to this, the evaporator entrance temperature T1 sharply increases to steeply increase the evaporator exit temperature T2, which may greatly deviate from a target evaporator exit temperature. As a result, the temperature of air fed into the vehicle interior greatly deviates from a set temperature, creates discomfort for the people in the car. This may be a serious problem in the summer when an ambient temperature is high.

The present invention provides an air conditioner for a vehicle, capable of quickly controlling the discharge of a variable capacity compressor in response to a change in the temperature of air drawn by an evaporator and minimizing a variation in the temperature of air blown from the evaporator into a vehicle interior.

An aspect of the present invention provides an air conditioner for a vehicle. The air conditioner has a refrigeration cycle including a variable capacity compressor, a condenser, an expansion valve, and an evaporator. The air conditioner also has a duct in which the evaporator is located, an air switching unit arranged on an upstream side of the duct and configured to switch outside air and inside air from one to the other, an air outlet arranged on a downstream side of the duct and communicating with an interior of the vehicle, and a control unit configured to control a discharge of the compressor. The control unit controls the compressor to provide a maximum capacity if the difference between a vehicle interior temperature and an ambient temperature is higher than a predetermined value and if the air switching unit is switched from a recirculation mode to a fresh air mode.

DETAILED DESCRIPTION OF EMBODIMENTS

An embodiment of the present invention will be explained with reference to the drawings.

Figure 4:
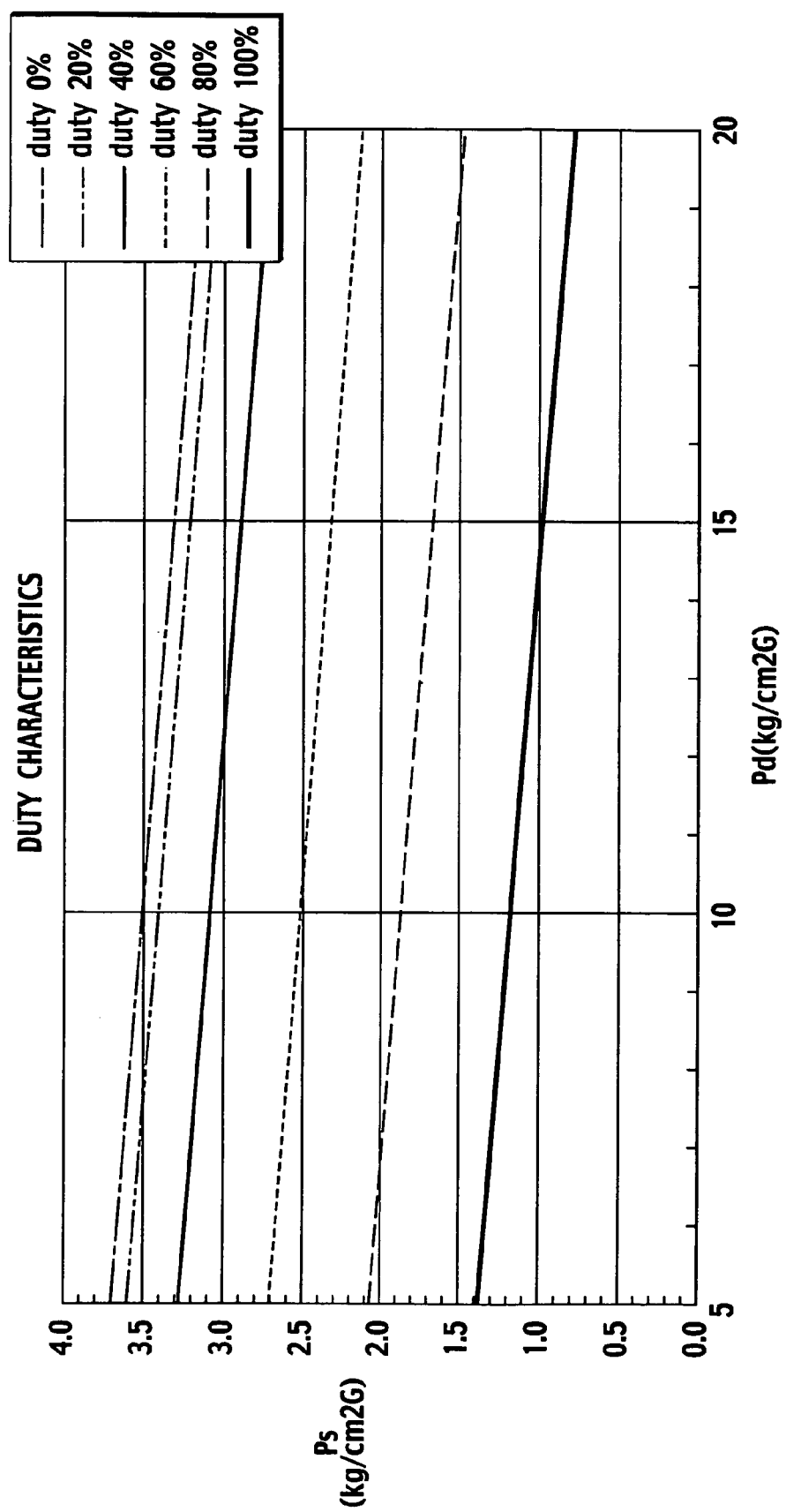
FIG. 4 is a graph showing characteristic curves of compressor suction pressure and compressor discharge pressure with different duty factors that control the discharge of the compressor of FIG. 2.
Figure 5:
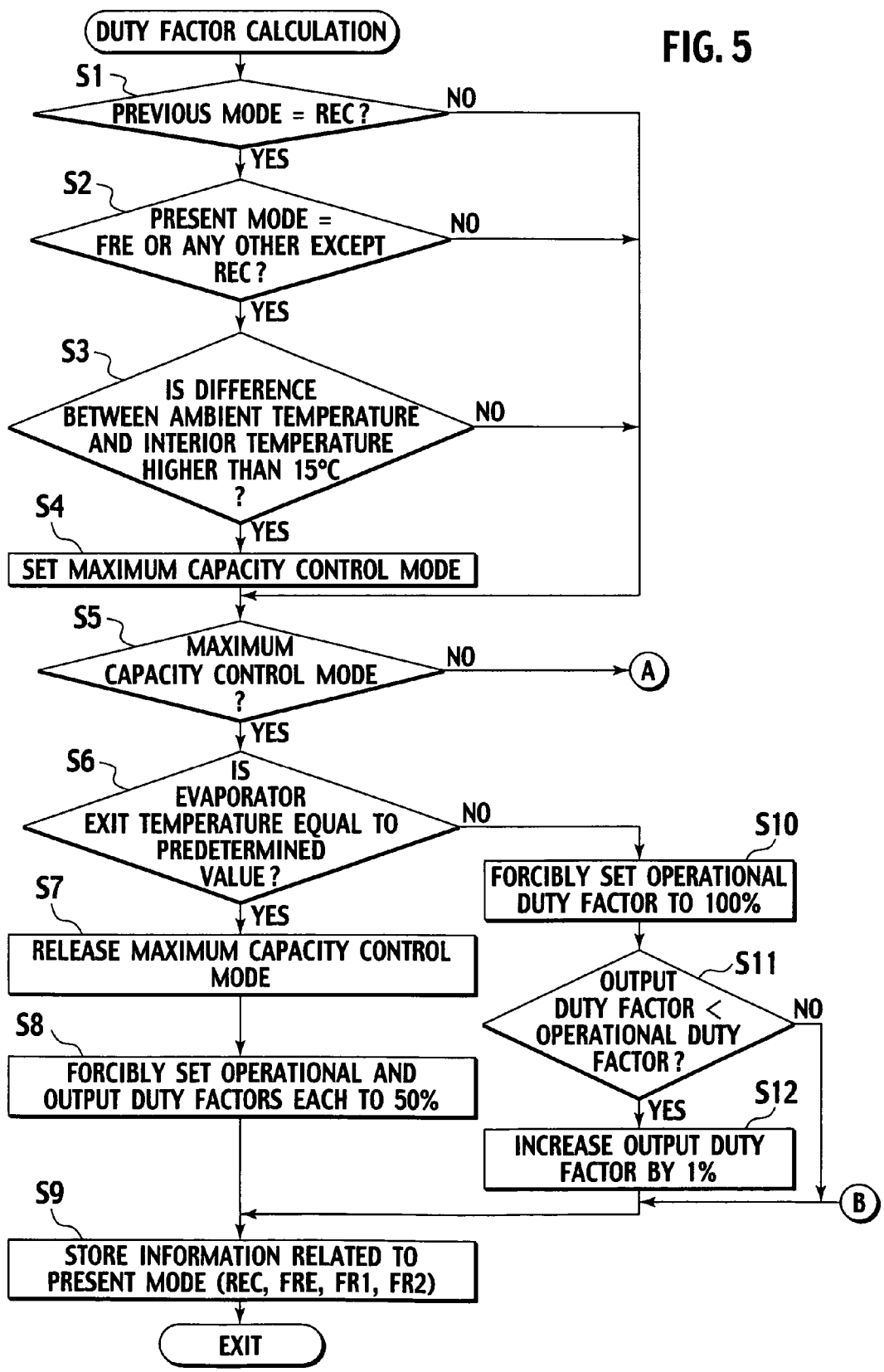
FIGS. 5 and 6 are flowcharts showing a process of controlling the discharge of the compressor of FIG. 2.
Figure 6:
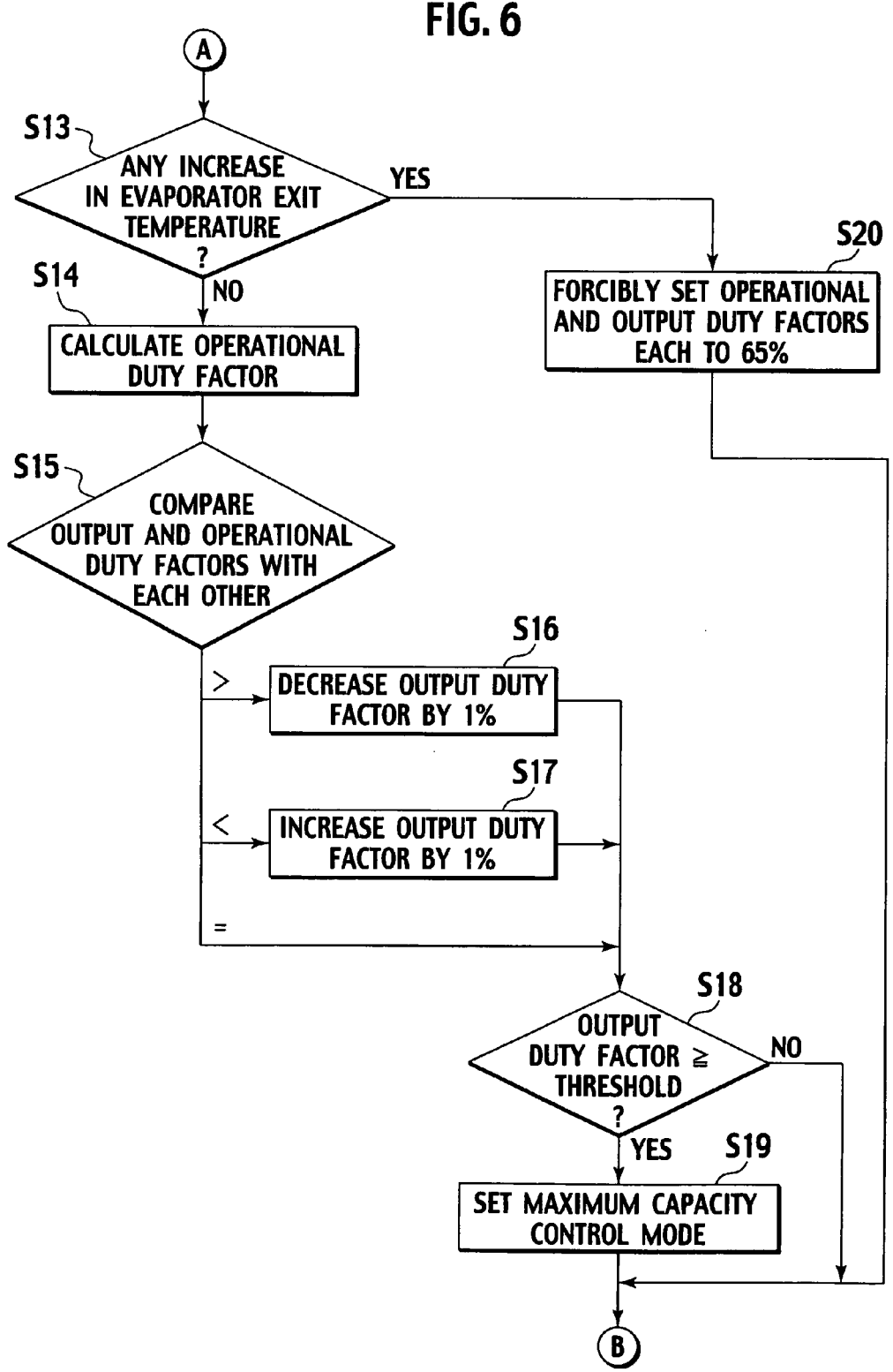

The indicia "A" and "B" shown in FIG. 5 are continuous to indicia "A" and "B" shown in FIG. 6. In FIGS. 4 to 11, "DUTY" or "duty" denotes the duty factor of a variable capacity compressor 8.

Figure 1:
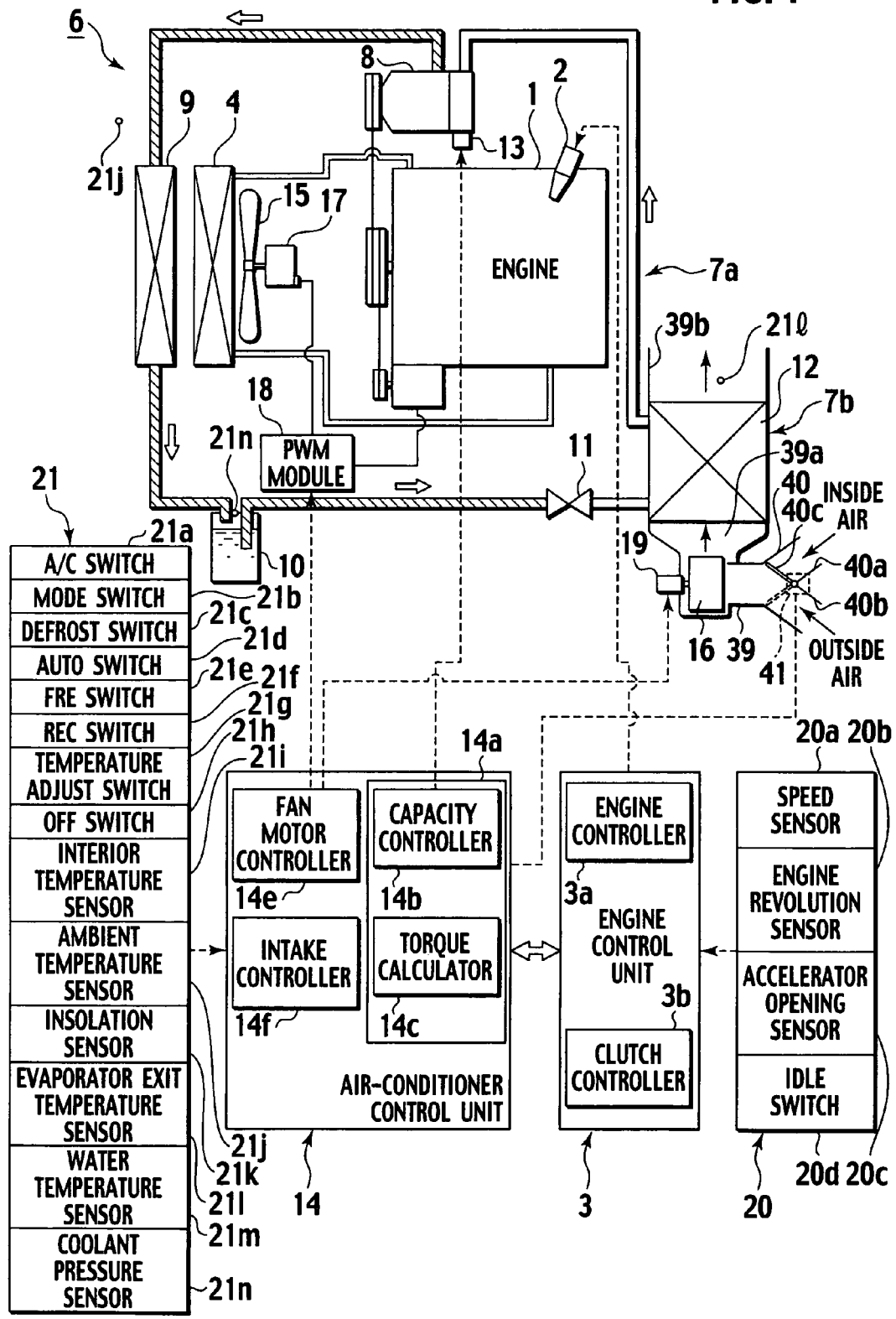
FIG. 1 is a block diagram showing an air conditioner for a vehicle, according to an embodiment of the present invention.

In FIG. 1, an engine 1 of the vehicle has a fuel injector 2 for injecting fuel. An opening of the fuel injector 2 is adjustable to change air supply (fuel mixture supply) to a cylinder bore of the engine and control revolutions of the engine 1. The engine 1 is connected through cooling water piping (not represented with a specific reference numeral) to a radiator 4 that radiates heat of the engine 1.

The engine 1 is mainly controlled by an engine control unit 3. The engine control unit 3 receives data from an engine control sensor group 20. The engine control sensor group 20 includes a speed sensor 20a, an engine revolution sensor 20b, an accelerator opening sensor 20c, an idle switch 20d, and the like. According to data from these sensors and engine control instructions, the engine control unit 3 including an engine controller 3a controls the engine 1 and fuel injector 2. The engine control unit 3 also includes a clutch controller 3b that controls the ON/OFF operation of an air conditioner (A/C) clutch 43 of the compressor 8.

The air conditioner 6 of the vehicle has a refrigeration cycle unit 7a and an air conditioning unit 7b. The air conditioning unit 7b includes an evaporator 12 and provides a temperature-adjusted air flow. The refrigeration cycle unit 7a includes the variable capacity compressor 8, a condenser 9, a liquid tank 10, a temperature-sensitive automatic expansion valve 11, the evaporator 12, and coolant piping (not represented with a specific reference numeral) that connects the components 8 to 11 to one another.

The compressor 8 includes the A/C clutch 43 (FIG. 2) to connect and disconnect the compressor 8 to and from the engine 1, which serves as a driving source. When the A/C clutch 43 is turned off, no driving force is transmitted from the engine 1 to the compressor 8, and therefore, the compressor 8 stops. When the A/C clutch 43 is turned on, driving force is transmitted from the engine 1 to the compressor 8 to drive the compressor 8. When driven, the compressor 8 compresses a low-temperature, low-pressure gaseous coolant and provides the condenser 9 with a high-temperature, high-pressure compressed liquid coolant.

The condenser 9 is arranged in front of the radiator 4, so as to be exposed to an air flow when the vehicle is running and a air flow from an electric fan 15. The high-temperature, high-pressure liquid coolant from the compressor 8 is cooled by the air flow passing through the condenser 9 to a condensation point and becomes a high-pressure, middle-temperature liquid coolant that flows into the liquid tank 10.

The liquid tank 10 removes water and foreign matter from the high-pressure, middle-temperature liquid coolant and separates liquid from gas. The separated liquid coolant is passed from the liquid tank 10 to the expansion valve 11.

The expansion valve 11 abruptly expands the high-pressure, middle-temperature liquid coolant into a low-pressure, low-temperature atomized liquid coolant. The atomized liquid coolant flows to the evaporator 12.

The evaporator 12 is arranged in a duct of the air conditioning unit 7b, which is located in a vehicle interior. The evaporator 12 cools air passing through the duct. The atomized liquid coolant passing through the evaporator 12 evaporates to remove heat from air passing through the evaporator 12, thereby cooling the air. The low-temperature, low-pressure gaseous coolant from the evaporator 12 flows to the compressor 8.

The air conditioning unit 7b is arranged in the vehicle interior and blows a temperature-adjusted air flow into the vehicle interior. The air conditioning unit 7b includes a casing 39 defining the duct 39a, an intake 40 arranged at an upstream end of the duct 39a, to take air into the duct 39a, a blower fan 16 arranged downstream from the intake 40, the evaporator 12 arranged downstream from the blower fan 16, and outlet door (not shown) for adjusting the openings of the outlet 39b of the duct 39a that is provided at a downstream end of the duct 39a and communicated with the vehicle interior.

The intake 40 includes an inside air intake 40a to take air from the vehicle interior, an outside air intake 40b to take air from the outside of the vehicle, and an intake door 40c to adjust the openings of the inside and outside air intakes 40a and 40b.

The blower fan 16 is driven by a blower fan motor 19. When the blower fan 16 is driven, the intake 40 takes inside and/or outside air into the duct 39a, and the air is blown toward the evaporator 12 that cools the air and sends the cooled air through the outlet 39b into the vehicle interior.

The variable capacity compressor 8 will be explained in detail.

First, a structure of the compressor 8 will be explained with reference to FIGS. 2 and 3.

Figure 2:
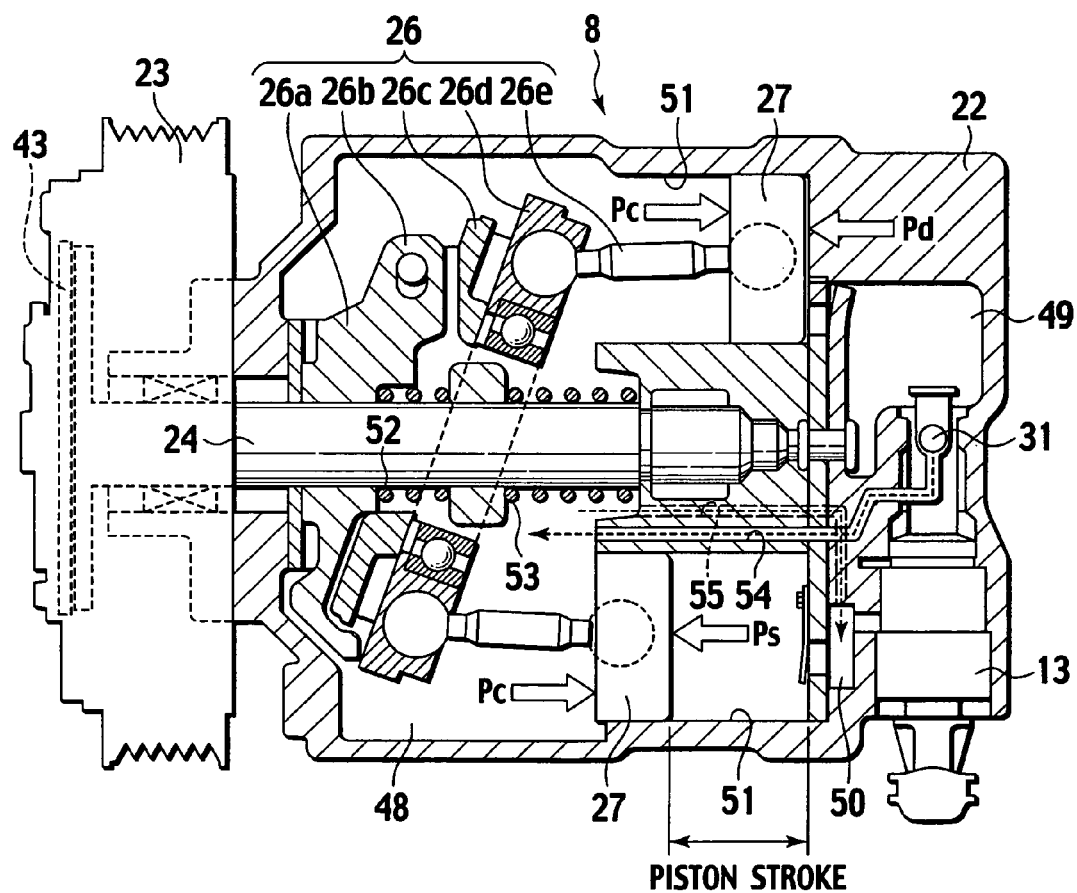
FIG. 2 is a sectional view showing a variable capacity compressor included in a refrigeration cycle of the air conditioner of FIG. 1.

In FIG. 2, the compressor 8 has a housing 22. The housing 22 defines cylinder bores 51 circumferentially formed around an axial line at regular intervals, a suction chamber 50 and a discharge chamber 49 formed on a top-dead-center side of the cylinder bores 51, and a crankcase 48 formed on a bottom-dead-center side of the cylinder bores 51. In each cylinder bore 51, a piston 27 reciprocates. The housing 22 supports a rotary shaft 24 that is freely rotatably in the crankcase 48. The clutch 43 of the compressor 8 connects and disconnects driving torque from the engine 1, serving as a driving source, to and from the rotary shaft 24. The rotary shaft 24 has a conversion mechanism 26 (26a, 26b, 26c, 26d, 26e) for converting rotation of the rotary shaft 24 into reciprocation of the pistons 27.

The conversion mechanism 26 includes, for example, a rotor 26a, a sleeve 26b, a hub 26c, a swash plate 26d, piston rods 26e, and the like. The rotor 26a is fixed to and rotatable with the rotary shaft 24. The sleeve 26b is slidable along the rotary shaft 24. The hub 26c is attached to the sleeve 26b, is freely inclinable relative to the rotary shaft 24, and is linked to the rotor 26a so that the hub 26c may rotate together with the rotary shaft 24. The swash plate 26d is attached to the hub 26c so that the swash plate 26d may incline relative to the rotary shaft 24. The piston rods 26e connect the swash plate 26d to the pistons 27.

When the clutch 43 is connected (turned on) to rotate the rotary shaft 24, each piston 27 reciprocates in the corresponding cylinder bore 50. The piston 27 draws coolant from the suction chamber 50 into the cylinder bore 50, compresses the drawn coolant in the cylinder bore 50, and discharges the compressed coolant from the cylinder bore 50 into the discharge chamber 49. Coolant is supplied from an upstream side to the compressor 8 and is guided through a suction port (not shown) into the suction chamber 50. Coolant in the discharge chamber 49 is discharged through a discharge port (not shown) to a downstream side of the compressor 8.

The piston 27 changes its stroke depending on an inclination angle of the swash plate 26d.

When the compressor 8 stops, a pressure Pc of the crankcase 48 becomes equal to a pressure (a low pressure Ps in the refrigeration cycle 7a) of the suction chamber 50. Then, the swash plate 26d and each piston 27 return to initial positions due to a force provided by first and second springs 52 and 53. According to the embodiment, the initial positions of the swash plate 26d and piston 27 are intermediate between a full-stroke position and a destroke (zero-stroke) position of the swash plate 26d and piston 27.

To enable the control of the discharge capacity of the compressor 8, the compressor 8 has a pressure introducing path 54 to connect the discharge chamber 49 to the crankcase 48, a pressure releasing path 55 to connect the crankcase 48 to the suction chamber 50, and a control valve 13 having a valve plug 31a to change the area of one (the pressure introducing path 54 according to the embodiment) of the pressure introducing path 54 and pressure releasing path 55.

Changing the opening of the valve plug 31a of the control valve 13 changes the flow rate of high-pressure coolant flowing from the discharge chamber 49 to the crankcase 48 through the pressure introducing path 54, thereby changing the pressure of the crankcase 48. This results in changing a pressure difference between a pressure on the top-dead-center side of the piston 27 (i.e., the pressure Ps of the suction chamber 50) and a pressure on the bottom-dead-center side of the piston 27 (i.e., the pressure Pc of the crankcase 48), thereby changing a piston stroke, i.e., the discharge capacity of the compressor 8.

Figure 3:
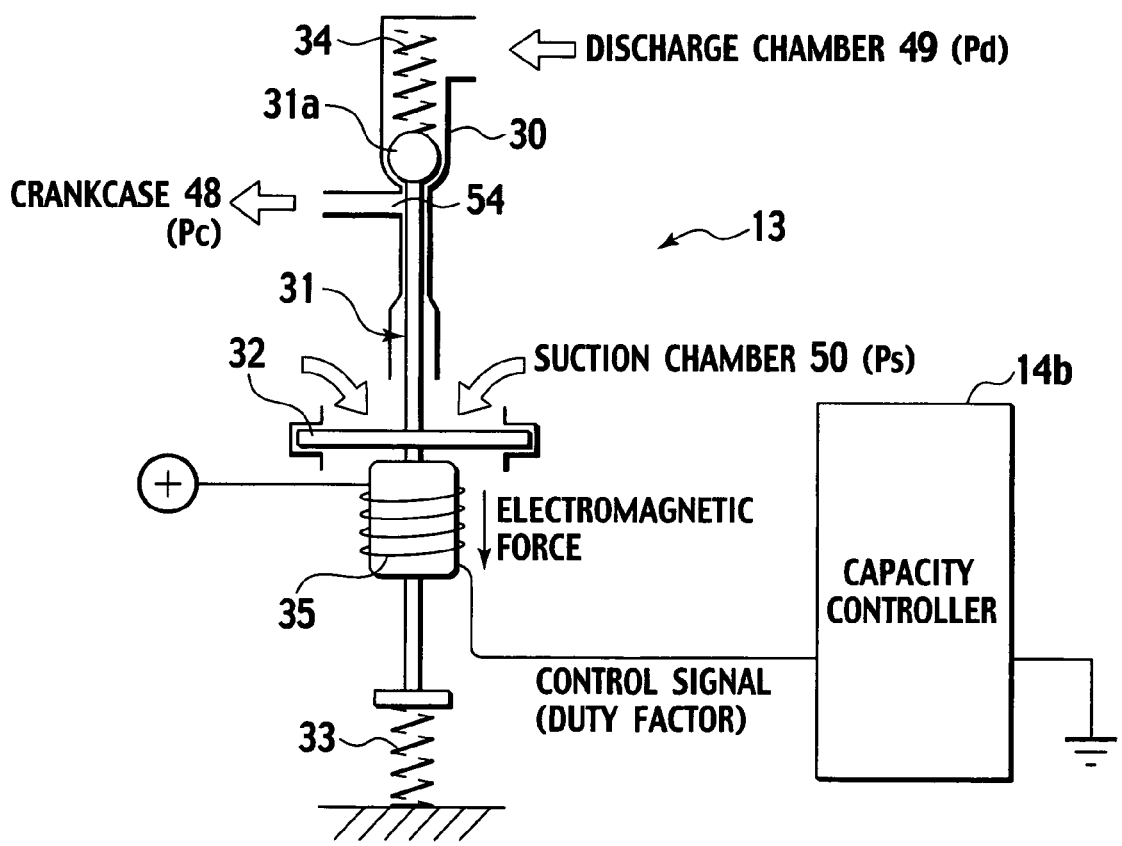
FIG. 3 is a view showing a control valve of the compressor of FIG. 2.

FIG. 3 shows the details of the control valve 13. The control valve 13 has a valve case 30 partly defining the pressure introducing path 54 and a plunger 31 that reciprocates in the valve case 30. The plunger 31 is integral with the valve plug (ball valve) 31a, a diaphragm 32, and a solenoid core of a electromagnetic coil 35 as an actuator. Lift of the plunger determines a sectional area of the pressure introducing path 54. The diaphragm 32 serves as a pressure sensitive part on which the suction pressure Ps of the suction chamber 50, i.e., the low pressure Ps of the refrigeration cycle 7a acts. Electromagnetic force produced by the electromagnetic coil 35, when the coil 35 is energized, is applied to the plunger 31 to move the plunger 31. Each axial end of the plunger 31 receives a spring force from set springs 33 and 34. The set springs 33 and 34 and diaphragm 32A determine a set pressure of the valve plug 31a.

The diaphragm 32 responds to the low pressure Ps. When the low pressure Ps decreases, the diaphragm 32 moves the valve plug 31a in a valve opening direction. When the low pressure Ps increases, the diaphragm 32 moves the valve plug 31a in a valve closing direction.

When the electromagnetic coil 35 is energized to produce electromagnetic force, the valve plug 31a moves in the valve closing direction. Namely, the electromagnetic force of the coil 35 can change the set pressure of the valve plug 31a.

The electromagnetic coil 35 receives a control pulse signal or an external control signal from a capacity controller 14b of an air-conditioner control unit 14 (to be explained later). The control pulse signal has a duty factor, and an electromagnetic force proportional to the duty factor is applied to the plunger 31. The applied electromagnetic force changes the set pressure of the valve plug 31a, thereby chanting a lift (valve opening) of the valve plug 31a. A change in the lift (valve opening) of the valve plug 31a changes a flow rate of high-pressure coolant flowing from the discharge chamber 49 to the crankcase 48 through the pressure introducing path 54. This operation results in changing the inclination of the swash plate 26d to change the piston stroke.

When the electromagnetic coil 35 is deactivated (duty factor of 0%), the discharge pressure (the high pressure of the refrigeration cycle 7a) Pd and suction pressure (the low pressure of the refrigeration cycle 7a) Ps follow a duty-factor-0% curve (dot-and-dash curve) shown in FIG. 4.

In the duty-factor-0% state, an assumption is made that load on the evaporator 12 changes to extremely increase the suction pressure Ps (for example, 5 Kg/cm$^2$G). The pressure of 5 Kg/cm$^2$G acts on the diaphragm 32 to push down the valve plug 31a to a totally closed position. At the totally closed position, no high-pressure coolant is introduced from the discharge chamber 49 to the crankcase 48 through the pressure introducing path 54, and coolant in the crankcase 48 is released through the pressure releasing path 55 to the suction chamber 50. As a result, the pressure of the crankcase 48 gradually decreases to the suction pressure Ps, thereby establishing a full-stroke (maximum capacity) state. Namely, the quantity of coolant circulating through the refrigeration cycle 7a increases to gradually decrease the suction pressure Ps. When the suction pressure Ps approaches the duty-factor-0% curve, the suction pressure Ps acting on the diaphragm 32 decreases to lift the valve plug 31a and increase the opening of the valve plug 31a. This operation results in increasing the flow rate of high-pressure coolant from the discharge chamber 49 into the crankcase 48 through the pressure introducing path 54, thereby increasing the pressure Pc of the crankcase 48. Namely, pressure acting on the back of the piston 27 gradually increases to gradually reduce the piston stroke, and a relationship between the pressures Ps and Pd stabilizes in a capacity controlled state along the duty-factor-0% curve.

If the duty factor is changed, the relationship between the pressures Pd and Ps stabilizes along a curve (FIG. 4) corresponding to the changed duty factor.

For example, if the duty factor is changed to 60%, the pressure relationship of the compressor 8 and refrigeration cycle 7a, i.e., the relationship between the discharge pressure Pd and the suction pressure Ps will follow a duty-factor-60% curve of FIG. 4.

In the duty-factor-60% state, an assumption is made that load on the evaporator 12 changes to extremely increase the suction pressure (low pressure) Ps (for example, 5 Kg/cm$^2$G). The pressure of 5 Kg/cm$^2$G acts on the diaphragm 32 to push down the valve plug 31a. The pressure of the crankcase 48 gradually decreases to the suction pressure Ps of the suction chamber 50, thereby establishing a full-stroke (maximum capacity) state. The quantity of coolant circulating through the refrigeration cycle 7a increases to gradually decrease the suction pressure Ps. When the suction pressure Ps approaches the duty-factor-60% curve, the suction pressure Ps acting on the diaphragm 32 decreases to lift the valve plug 31a. This operation results in increasing the pressure acting on the back of the piston 27, thereby gradually reducing the piston stroke. The low pressure Ps and high pressure Pd stabilize to establish a capacity controlled state along the duty-factor-60% curve.

In this way, the suction pressure Ps of the compressor 8 can be approximated according to the duty factor and the discharge pressure Pd of the compressor 8.

The air conditioner 6 is mainly controlled by the air-conditioner control unit 14 and partly by the engine control unit 3.

In FIG. 1, the air-conditioner control unit 14 is connected to the engine control unit 3 with a bidirectional communication line. The air-conditioner control unit 14 receives data from an air-conditioner control sensor group 21. The sensor group 21 includes standard sensors provided for the air conditioner 6, such as an air-conditioner (A/C) switch 21a, a mode switch 21b, a defrost switch 21c, an auto switch 21d, a fresh air (FRE) switch 21e, a recirculation (REC) switch 21f, a temperature adjust switch 21g, an OFF switch 21h, an interior temperature sensor 21i to detect a temperature in the vehicle interior, an ambient temperature sensor 21j to detect a temperature outside the vehicle, an insolation sensor 21k, an evaporator exit temperature sensor 21l to detect an air temperature at the exit of the evaporator 12, a water temperature sensor 21m, a coolant pressure sensor 21n to detect a coolant pressure on the discharge side of the compressor 8, and the like.

The air-conditioner control unit 14 controls the compressor 8, blower fan motors 17 and 19, intake door 40, and the like according to data from the above-mentioned sensors and air-conditioner control instructions.

The air-conditioner control unit 14 includes the compressor controller 14a, a fan motor controller 14e, and an intake controller 14f as shown in FIG. 1.

The fan motor controller 14e receives a target interior temperature set by a passenger through the temperature adjust switch 21g and data from the sensors of the air-conditioner control sensor group 21, calculates a flow rate of air to be supplied from the air conditioning unit 7b, and according to the calculated flow rate, controls the fan motor 17 of the electric fan 15 through a PWM (pulse width modulation) module 18, thereby controlling a flow rate of the electric fan 15. At the same time, the fan motor controller 14e controls the fan motor 19 of the electric fan 16, to control a flow rate of the electric fan 16. The fan motors 15 and 19 may be directly or indirectly controlled with the engine control unit 3.

If the fresh air (FRE) switch 21e is pushed or if a control signal to establish an outside air mode (fresh air mode) is provided, the intake controller 14f drives a door driver 41 of the intake door 40c to close the inside air intake 40a and open the outside air intake 40b so that fresh air is guided into the duct of the air conditioning unit 7b. If the recirculation (REC) switch 21f is pushed or if a control signal to establish an inside air mode (recirculation mode) is provided, the intake controller 14f drives the door driver 41 of the intake door 40c to open the inside air intake 40a and close the outside air intake 40b so that inside air is introduced into the duct of the air conditioning unit 7b.

The compressor controller 14a includes the capacity controller 14b and torque calculator 14c.

The capacity controller 14b controls the control valve 13 of the compressor 8. The capacity controller 14b receives a target interior temperature set by a passenger with the temperature adjust switch 21g and data from the sensors, calculates a target conditioned air temperature supplied from the air conditioning unit 7b, finds, according to the calculated target conditioned air temperature, a target air temperature at the exit of the evaporator 12, calculates a duty factor to bring an actual air temperature at the exit of the evaporator 12 to the calculated target air temperature at the exit of the evaporator 12, and transfers the calculated duty factor to the control valve 13.

In this way, the capacity controller 14b provides the control valve 13 with a control pulse signal having a duty factor that determines a coolant discharge of the compressor 8. If the capacity controller 14b provides the control valve 13 with a maximum capacity signal having a maximum duty factor of 100%, the valve plug 31a of the control valve 13 moves to the closed position. Then, no pressure is introduced from the discharge chamber 49 to the crankcase 48 through the pressure introducing path 54. As a result, the pressure of the crankcase 48 decreases, the swash plate 26d inclines to a maximum inclination angle, and the piston 27 takes a full-stroke position. Consequently, the discharge of the compressor 8 increases to the maximum.

If the capacity controller 14b provides the control valve 13 with a minimum discharge signal having a minimum duty factor of 0%, the valve plug 31a of the control valve 13 moves to an open position. Then, pressure is introduced from the discharge chamber 49 into the crankcase 48 through the pressure introducing path 54. As a result, the pressure of the crankcase 48 increases, the swash plate 26d inclines to a minimum inclination angle, and the piston 27 takes a destroke position. Consequently, the discharge of the compressor 8 decreases to the minimum.

In this way, the capacity controller 14b adjusts a duty factor to adjust a flow rate of high-pressure coolant to be introduced from the discharge chamber 49 into the crankcase 48 through the pressure introducing path 54, thereby controlling the coolant discharge of the compressor 8.

In a steady-state operation, the capacity controller 14b works in a normal mode to calculate a duty factor according to a target air temperature at the exit of the evaporator 12 and an actual air temperature at the exit of the evaporator 12 provided by the sensor 21l. The capacity controller 14b may work in a minimum duty factor mode and a maximum duty factor mode. In the maximum duty factor mode, the capacity controller 14b maintains the maximum duty factor (100%). In the minimum duty factor mode, the capacity controller 14b maintains the minimum duty factor (0%).

Figure 11:
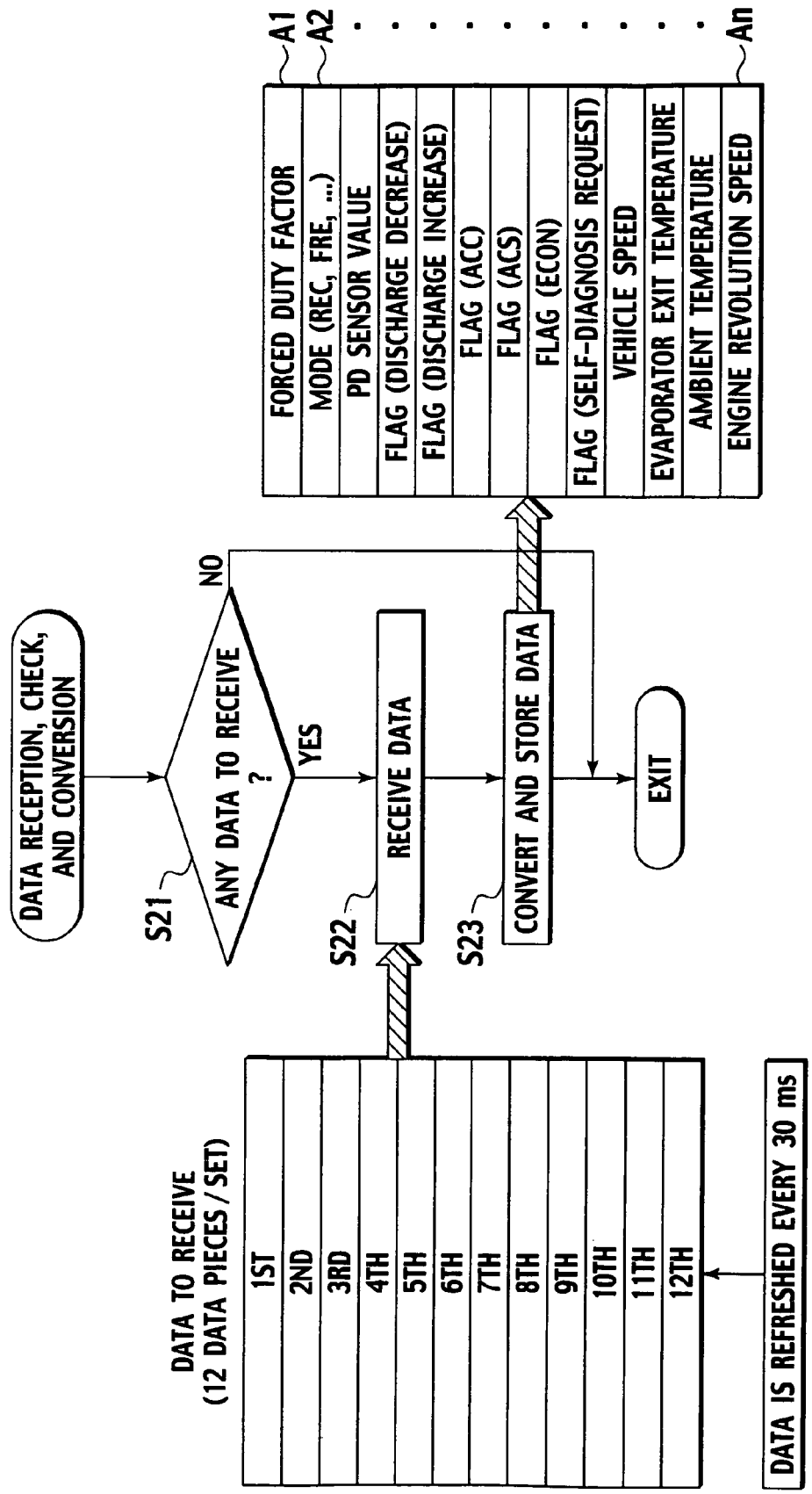
FIG. 11 is a view showing a data handling process carried out by an air-conditioner control unit of the air conditioner of FIG. 1.
Figure 12:
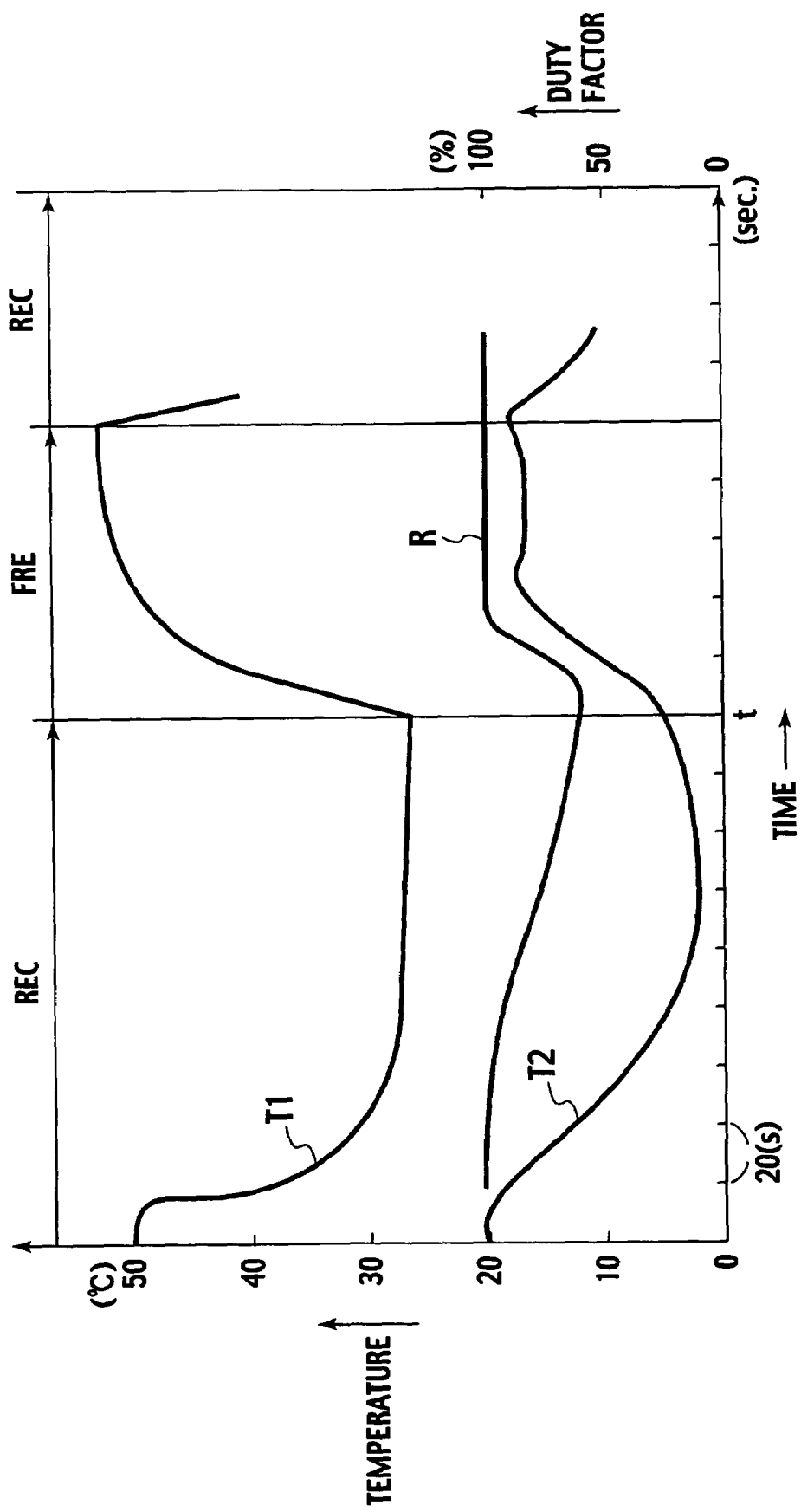
FIG. 12 is a graph showing the related art of controlling the discharge of a variable capacity compressor for a vehicle air conditioner, curves in the graph representing the temperature of air supplied to an evaporator, the duty factor of a discharge control signal, and the temperature of air blown from the evaporator when a recirculation (REC) mode is switched to a fresh air (FRE) mode.

FIG. 11 shows a data handling process carried out by the air-conditioner control unit 14. In step S21 of FIG. 11, the control unit 14 determines whether or not there is data to be received. If there is data to be received, the control unit 14 receives, in step S22 a, group of twelve pieces of data. In step S23, the control unit 14 converts the received data into proper data, classifies the converted data into duty data, mode data (REC, FRE, . . . ), and the like, and stores the classified data in memory areas A1 to An. This process is carried out at intervals of 30 ms. Namely, the data shown in FIG. 11 is refreshed every 30 ms.

Controlling the control valve 13 of the variable capacity compressor 8 will now be explained. The control is carried out by the capacity controller 14b of the air-conditioner control unit 14 according to flowcharts shown in FIGS. 5 and 6.

In step S1 of FIG. 5, the capacity controller 14b determines whether or not the previous mode was a recirculation (REC) mode. If the previous mode was the recirculation mode, the capacity controller 14b determines, in step S2, whether or not a present mode is a fresh air (FRE) mode. If the present mode is the fresh air mode, the capacity controller 14b determines, in step S3, whether or not the difference between an ambient temperature and an evaporator intake temperature (i.e., a vehicle interior temperature) is equal to or higher than a predetermined value (15° C. in this embodiment). If the difference is equal to or higher than the predetermined value, the capacity controller 14b sets, in step S4, a maximum capacity mode. If step S1 determines that the previous mode was not the recirculation mode, or if step S2 determines that the present mode is not the fresh air mode, or if step S3 determines that the temperature difference is less than the predetermined value, step S5 is carried out.

In step S5, the capacity controller 14b determines whether or not the maximum capacity mode is set. If the maximum capacity mode is set, steps S6 to S12 are carried out. Namely, in step S6, the capacity controller 14b determines whether or not an evaporator exit temperature T2 is equal to or higher than a predetermined value, which is less than a target evaporator exit temperature by one degree centigrade or more. If the evaporator exit temperature T2 is equal to or higher than the predetermined value, the capacity controller 14b cancel, in step S7, the maximum capacity mode, forcibly sets, in step S8, an operational duty factor of 50% and an output duty factor of 50%, stores, in step S9, information related to the set control mode (REC, FRE, FR1, FR2, and the like), and ends the process.

Figure 8:
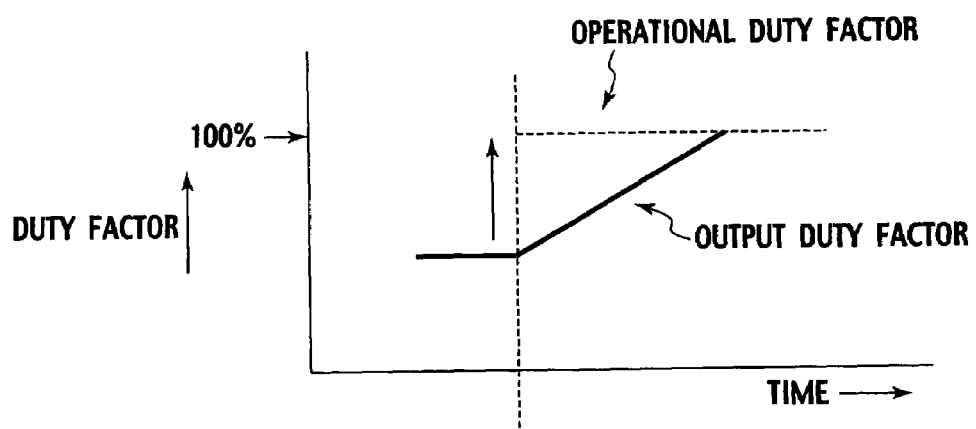
FIG. 8 is a characteristic curve showing an operation of setting an operational duty factor of 100%.

If step S6 determines that the evaporator exit temperature T2 is less than the predetermined value, the capacity controller 14b forcibly sets, in step S10, an operational duty factor of 100% as shown in FIG. 8 and compares, in step S11, the operational duty factor with an output duty factor. If the output duty factor is smaller than the operational duty factor, the capacity controller 14b increases, in step S12, the output duty factor by 1%. The duty factors are examined at intervals of about 100 ms, and therefore, the output duty factor reaches 100% within about 10 seconds, even if it is initially 0%.

After step S12, step S9 is carried out to store information related to the set control mode, and the process ends. If step S11 determines that the output duty factor is not smaller than the operational duty factor, step S12 is bypassed and step S9 is carried out.

Figure 10A:
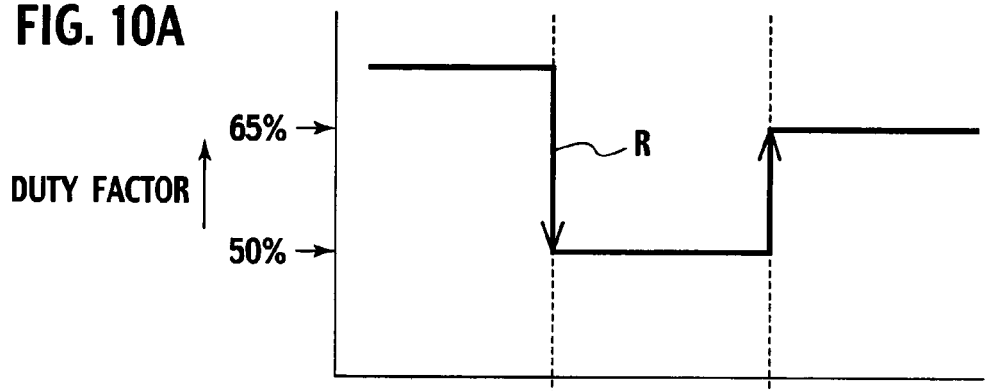
FIGS. 10A and 10B are characteristic curves showing an intermediate control mode.
Figure 10B:
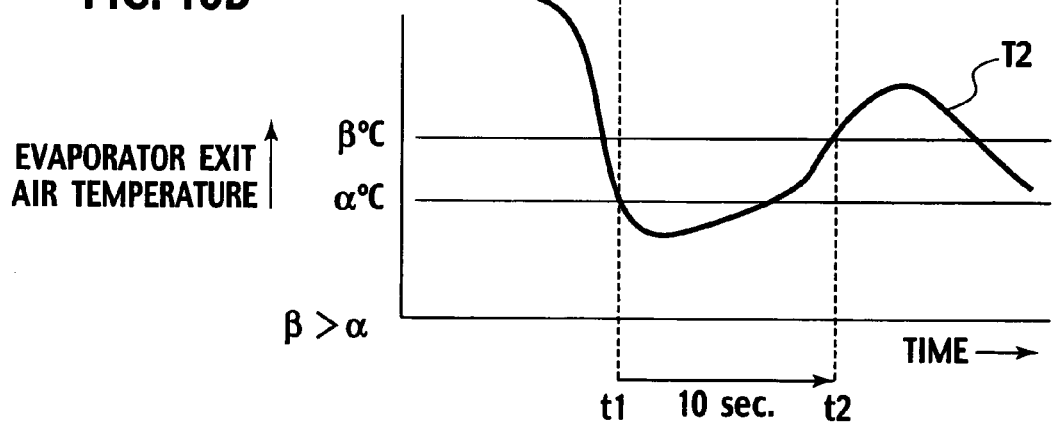

If step S5 determines that the maximum capacity mode is not set, the capacity controller 14b changes the operational duty factor and output duty factor R from 100% to 50% at time t1, shown in FIGS. 10A and 10B. Thereafter, step S13 of FIG. 6 is carried out. In step S13, the capacity controller 14b determines at time t2 whether or not there is an increase in the evaporator exit temperature T2, with t2 being ten seconds after t1. If there is no increase in the evaporator exit temperature T2, normal control is carried out through steps S14 to S19. Namely, in step S14, the capacity controller 14b calculates an operational duty factor as follows:

Present cumulative value=Previous cumulative value+ Accumulation constant×(Evaporator exit temperature T2−Target evaporator exit temperature)  (1)

Operational duty factor=Proportional constant× (Evaporator exit temperature T2−Target evaporator exit temperature)+Present cumulative value  (2)

In step S15, the capacity controller 14b compares the operational duty factor with an output duty factor. If the output duty factor is larger than the operational duty factor, the capacity controller 14b decreases, in step S16, the output duty factor by 1% and carries out step S18. If the output duty factor is smaller than the operational duty factor, the capacity controller 14b increases, in step S17, the output duty factor by 1% and carries out step S18. If the output duty factor is equal to the operational duty factor, the capacity controller 14b bypasses steps S16 and S17 and carries out step S18.

Figure 9:
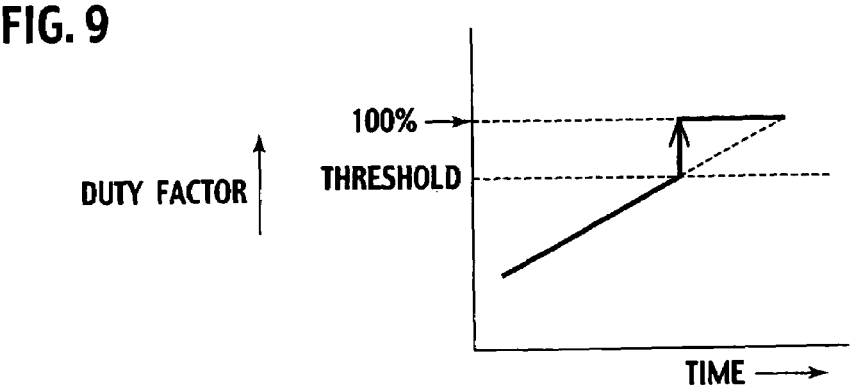
FIG. 9 is a characteristic curve showing a normal mode.

In step S18, the capacity controller 14b determines whether or not the output duty factor is equal to or larger than a predetermined value. This predetermined value is a threshold (FIG. 9) to determine if the maximum capacity mode can be started without a problem. If the output duty factor is equal to or large than the threshold, as shown in FIG. 9, the capacity controller 14b sets, in step S19, the maximum capacity mode and advances to step S9 of FIG. 5. If the output duty factor is less than the threshold in step S18, the capacity controller 14b bypasses step S19 and advances to step S9 of FIG. 5.

If step S13 determines that there is an increase in the evaporator exit temperature T2 at a time t2 that is ten seconds after time t1, step S20 is carried out. In step S20, the capacity controller 14b sets an intermediate control mode between the maximum capacity mode and the normal control mode. In the intermediate control mode, the capacity controller 14b sets an output duty factor of 65% and an operational duty factor of 65% to control the discharge of the compressor 8.

Effects of the embodiment will be explained.

If the difference between an ambient temperature and an evaporator intake temperature is larger than a predetermined value (15° C. in the embodiment) and if a recirculation (REC) mode is switched to a fresh air (FRE) mode, the air-conditioner control unit 14 of the embodiment provides the control valve 13 of the variable capacity compressor 8 with a maximum capacity instruction. As a result, the discharge of the compressor 8 is speedily increased to minimize a sudden change in the temperature of air blown from the evaporator 12 into a vehicle interior.

Figure 7:
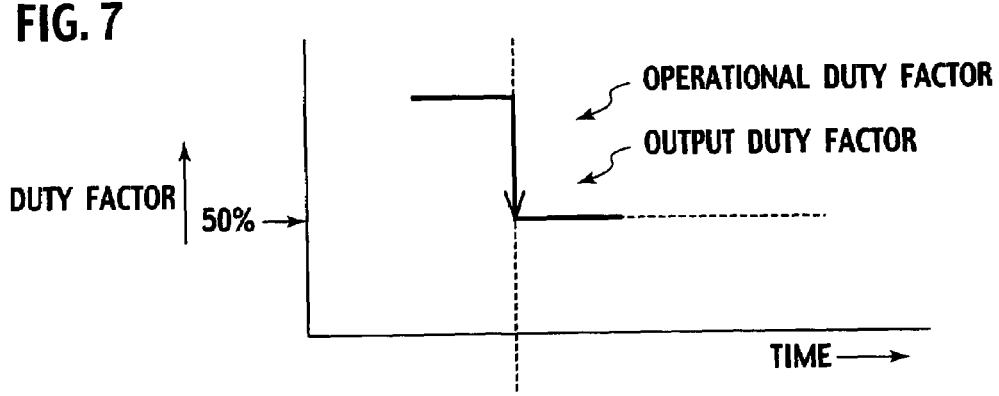
FIG. 7 is a characteristic curve showing an operation of releasing a maximum capacity mode.

If the temperature of air blown from the evaporator 12 reaches a target value with the compressor 8 operated at the maximum capacity, the embodiment releases the maximum capacity mode in step S7 and sets an operational duty factor of 50% and an output duty factor of 50% as shown in FIG. 7. This results in reliably changing the stroke of each piston 27 of the compressor 8 from a full stroke to an intermediate stroke.

If the difference between the ambient temperature and the evaporator intake temperature is less than 15° C., the embodiment achieves the normal control mode in steps S14 to S19, to gradually increase the discharge of the compressor 8 so as to gradually increase coolant flowing through the evaporator 12. As a result, people in the vehicle are never bothered by a sudden change in the temperature of air blown from the evaporator 12 into the vehicle interior. The same control is carried out when the instruction to switch the recirculation mode to the fresh air mode is not provided.

If there is an increase in an evaporator exit temperature after the duty factor of 50% is set, the embodiment sets, in step S20, the intermediate control mode for the compressor 8. The intermediate control mode is in-between the maximum capacity mode and the normal control mode. With this control, the embodiment can quickly cope with an increase in the evaporator exit temperature.

During a recirculation mode, an evaporator intake temperature is substantially equal to a vehicle interior temperature, and therefore, the embodiment employs a temperature measured with the evaporator intake temperature sensor 21l as a vehicle interior temperature when determining the difference between outside and inside temperatures of the vehicle. The present invention is not limited to the foregoing description. For example, a temperature measured by the interior temperature sensor 21i may be used as a vehicle interior temperature. It is also possible to employ a change in evaporator intake temperature to estimate the difference between outside and inside temperatures of the vehicle.

As mentioned above, the present invention can stabilize the temperature of air fed into a vehicle interior when a recirculation mode is switched to a fresh air mode, to ensure a comfortable state in the vehicle interior without causing discomfort to people in the vehicle. The present invention is particularly effective in the summer season when there is a large difference between inside and outside temperatures of the vehicle.

Although the present invention has been described above by reference to certain embodiments, the present invention is not limited to them. Modifications and variations of the embodiments can be made without departing from the spirit or scope of the appended claims. The embodiments are only for illustrative purposes and are not intended to limit the present invention.

What is claimed is:

1. An air conditioner for a vehicle, comprising:
   a refrigeration cycle system including a variable capacity compressor, a condenser, an expansion valve, and an evaporator;
   an air duct in which the evaporator is provided;
   an air switching unit arranged on an upstream side of the air duct and configured to switch between vehicle exterior air and vehicle interior air to be introduced into the air duct;
   an air outlet arranged on a downstream side of the air duct and configured to communicate with a vehicle interior to discharae air from the air duct into the vehicle interior; and
   a control unit configured to control a discharge of the compressor, the control unit controlling the compressor to provide a maximum capacity when a difference between a vehicle interior air temperature and a vehicle exterior air temperature is higher than a predetermined values, when the air switching unit is switched from a recirculation mode to a fresh air mode.

2. The air conditioner of claim 1, wherein:
   the variable capacity compressor comprises:
   a cylinder bore;

a suction chamber arranged on a top-dead-center side of the cylinder bore;

a discharge chamber arranged on the top-dead-center side of the cylinder bore;

a crankcase arranged on a bottom-dead-center side of the cylinder bore;

a pressure releasing path connecting the crankcase and suction chamber to each other;

a pressure introducing path connecting the crankcase and discharge chamber to each other; and a control valve configured to open and close one of the pressure releasing path and pressure introducing path;

the control valve including:

a valve plug configured to open and close the one of the pressure releasing path and pressure introducing path; and an actuator configured to move the valve plug and adjust a degree of opening of the control valve; and the control unit is configured to control the actuator so as to control the degree of opening of the control valve and a discharge of the compressor.

3. The air conditioner of claim 1, wherein:

the control unit controls the compressor to operate in a normal operation mode when at least one of a first and second conditions is met, the first condition being that the difference between the vehicle interior temperature and the vehicle exterior air temperature is lower than the predetermined value, and the second condition being that no instruction is issued to switch the recirculation mode to the fresh air mode.

4. The air conditioner of claim 1, wherein:

the vehicle interior air is introduced into the air duct via the air switching unit on the recirculation mode, and the vehicle exterior air is introduced into the air duct via the air switching unit on the fresh air mode.

* * * * *